T. J. LITLE, Jr.
FUEL PREHEATING DEVICE FOR INTERNAL COMBUSTION ENGINES.
APPLICATION FILED JUNE 7, 1920.
1,388,473.
Patented Aug. 23, 1921.
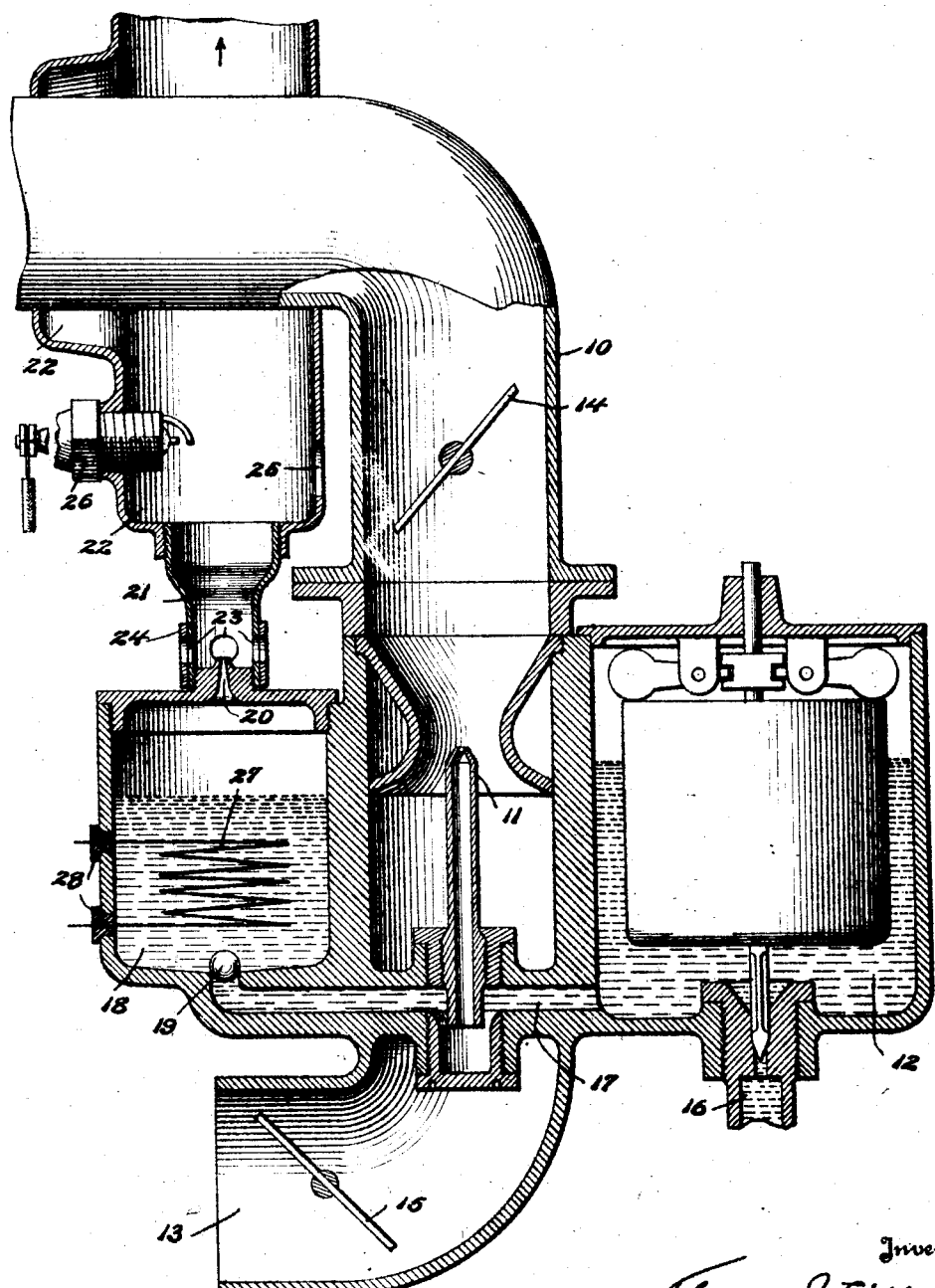

UNITED STATES PATENT OFFICE.

THOMAS J. LITLE, JR., OF DETROIT, MICHIGAN, ASSIGNOR TO LINCOLN MOTOR COMPANY, OF DETROIT, MICHIGAN, A CORPORATION OF DELAWARE.

FUEL PREHEATING DEVICE FOR INTERNAL-COMBUSTION ENGINES.

1,388,473.   Specification of Letters Patent.   Patented Aug. 23, 1921.

Application filed June 7, 1920. Serial No. 387,050.

*To all whom it may concern:*

Be it known that I, THOMAS J. LITLE, Jr., a citizen of the United States, and resident of Detroit, in the county of Wayne and State of Michigan, have invented certain new and useful Improvements in Fuel Preheating Devices for Internal - Combustion Engines, of which the following is a specification.

The object of this invention is to provide a fuel preheating device for internal combustion engines, particularly motor vehicle engines, by means of which the starting of the engine in cold weather is facilitated and which may be used while the engine is running, in conjunction with the ordinary carbureting instrumentalities, to insure a proper vaporization of the gaseous fuel. The heavy oils often used as fuel for motor vehicle engines are difficult to volatilize and, especially when the engine is cold, often form an imperfect or wet mixture which tends to condense on the walls of the intake pipe and the cylinders.

Various devices have heretofore been designed or suggested for preheating the fuel supplied to the engine to insure a dry mixture from which the oil content will not readily be lost by condensation, before reaching the explosion chamber. Electrical heating devices have been employed for this purpose; heaters warmed by the burned gases passing from the engine; and also devices for carbureting fuel and burning the same in proximity to the intake pipe to heat the same in the manner of a blow torch. These devices have however, not come into general use because of the expense involved in their installation and upkeep, their bulk in a good many cases, and because of their incapacity to completely perform the required functions.

This invention provides a device of this character which is inexpensive to manufacture and operate, which may be installed in small space on engines already in use as well as on new engines, and which is thoroughly effective in operation, enabling the motor to be readily started in the coldest weather and insuring a dry mixture when the motor is idling. One form of the invention will be disclosed in the following description when taken in connection with the accompanying drawing.

In the drawing the preheating device is illustrated as attached to a carbureter, and this is a convenient form of construction, but it will be understood that it may be made in different forms, for instance, as a separate unit, if desired. To the lower end of the intake manifold 10 of any well known type of internal combustion engine (not illustrated) is secured the upper end of a carbureter having a fuel jet 11, float chamber 12 and air inlet pipe 13. A throttle 14 controls the passage of gas from the carbureter to the engine and a choke valve 15 controls the flow of air through the air inlet, in well known manner. The liquid fuel passes to the float chamber through inlet pipe 16 and a horizontal conduit 17 is provided for leading the fuel from the float chamber to the fuel jet 11 and also to a vaporizing chamber 18 the entrance to which is controlled by a ball check valve 19.

The vaporizing chamber has an orifice 20 in its top which orifice is surrounded by the lower end of a gas and air mixing tube 21 which is secured at its upper end to a casing 22 surrounding the intake pipe 10. The tube 21 constitutes a mixing device of the Bunsen burner type, there being air inlet ports 23 at its lower end adjacent the vapor orifice 20, the effective area of these openings being controlled by a rotatable sleeve 24 having similar air openings. The casing or burner member 22 may have at its lower end additional air inlet ports if desired, such as port 25, and the upper end of this casing communicates preferably with a suitable duct or conduit leading to a point at which burned gases may be discharged without danger to the engine or annoyance to the operator.

This casing 22 constitutes a flame inclosing and confining shield preventing the flame of the preheating device from reaching any part of the engine it may damage and directing the heat against the intake manifold 10. In the lower end of casing 22 is secured a spark plug 26 which may be either connected to the ignition system of the motor or to a special electrical system. The spark gap of this plug lies in the pathway of the combustible gases passing upwardly from the mixing tube 21 into the casing 22 and, when operating, is adapted to ignite this mixture, causing a hot flame within the casing 22 the heat of which so warms the manifold 10 that the gaseous fuel passing therethrough to the engine cylinders is completely vaporized.

Within the vaporizing chamber 18 is located an electrical heating coil 27 the terminals of which pass through insulating plugs 28 in the wall of the chamber and may be connected to either the usual storage battery or to a special battery provided for the purpose. When the current is passed through this heating coil it quickly raises the temperature of the fuel in the vaporizing chamber to the vaporizing point and the vapors generated pass upwardly in a jet through orifice 20 and, after being mixed with air in the mixing tube 21, pass into the casing 22 where they are ignited by the spark plug 26 and burned. The electrical connections to the coil 27 and spark plug 26 may be arranged so that the action of the device is automatic, and is brought into action when the motor is first turned over, or may be arranged so that these circuits are adapted to be manually closed in advance of the initial turning over of the engine. The heating device may be used for starting purposes only and switched off when the engine has been sufficiently warmed or it may be used continuously, as when heavy oils are being used as fuel.

The fuel may be supplied directly from the constant level float chamber of the carbureter or from a separate source as desired and the heating chamber or flame casing 22 may be placed at any point of the carbureting system which seems most advantageous. The casing may in fact be open-ended and the products of combustion pass directly into the atmosphere where there is no danger of the flame coming in contact with parts which may be damaged thereby. It will be obvious that many changes may be made in the design and arrangement of the component parts of the invention which is not limited in its scope to the exact form illustrated and described.

Having thus described my invention what I claim as new and desire to secure by Letters Patent is:

1. In an internal combustion engine, in combination, means for supplying fuel thereto, and means for preheating the fuel comprising a flame inclosing and confining casing in heating relation to said fuel supplying means, a vaporizing chamber for a volatile combustible fluid in communication with said casing, and heating means for vaporizing the hydrocarbon in said chamber, the resulting vapors passing into the flame inclosing chamber for ignition.

2. In an internal combustion engine, in combination, means for supplying fuel thereto, and means for preheating the fuel comprising a flame inclosing and confining casing in heating relation to said fuel supplying means, a vaporizing chamber for a volatile combustible fluid having a vapor outlet, means for conducting the vapor issuing from said outlet to the casing and mixing it with air, and heating means for vaporizing the hydrocarbon in said chamber.

3. In an internal combustion engine, in combination, means for supplying fuel thereto, and means for preheating the fuel comprising a flame inclosing and confining casing in heating relation to said fuel supplying means, a vaporizing chamber for a volatile combustible fluid, having a vapor outlet, heating means for vaporizing the fluid in said chamber and means for conducting the vapors issuing from said orifice to said casing and mixing the vapors with air, to provide a combustible gas.

4. In an internal combustion engine in combination, means for supplying a fuel thereto, and means for preheating the fuel comprising a gas burner member adapted to be placed in heating relation to said fuel supplying means, a vaporizing chamber for a volatile combustible fluid in communication with said member, and heating means for vaporizing the fluid in said chamber, the resulting vapors passing to the gas burner member for ignition.

5. In an internal combustion engine, in combination, means for supplying a fuel thereto, and means for preheating the fuel comprising a gas burner member in heating relation to said fuel supplying means, a vaporizing chamber for a volatile combustible fluid located below said burner member and communicating therewith by means of an orifice in its top, and heating means for vaporizing the fluid in said chamber, the resulting vapors passing to the gas burning member for ignition.

6. In an internal combustion engine, in combination, means for supplying a fuel thereto, and means for preheating the fuel comprising a gas burner member in heating relation to said fuel supplying means, a vaporizing chamber for a volatile combustible fluid, having a vapor outlet, a gas and air mixing tube for conducting the vapors issuing from said vapor outlet to said burner member and simultaneously mixing them with air, and heating means for vaporizing the fluid in said chamber, the resulting gases passing to the gas burner member for ignition.

7. In an internal combustion engine, in combination, means for supplying a fuel thereto, and means for preheating the fuel comprising a gas burner member in heating relation to said fuel supplying means, a vaporizing chamber for a volatile combustible fluid, having a vapor outlet, a gas and air mixing tube of the Bunsen burner type for conducting the vapors issuing from said vapor outlet to said burner member and simultaneously mixing them with air and heating means for vaporizing the fluid in said chamber, the resulting gases passing to the gas burner member for ignition.

8. In an internal combustion engine in combination, means for supplying a fuel thereto, and means for preheating the fuel, comprising a gas burner member adapted to be placed in heating relation to said fuel supplying means, a vaporizing chamber for a volatile combustible fluid in communication with said casing, and electrical heating means for vaporizing the fluid in said chamber, the resulting vapors passing to the gas burner member for ignition.

9. In an internal combustion engine in combination, means for supplying a fuel thereto, and means for preheating the fuel, comprising a gas burner member adapted to be placed in heating relation to said fuel supplying means, a vaporizing chamber for a volatile combustible fluid in communication with said casing, and an electrical heating coil in said chamber and insulated from its walls, for vaporizing the fluid in said chamber, the resulting vapors passing to the gas burner member for ignition.

10. In an internal combustion engine in combination, means for supplying a fuel thereto, and means for preheating the fuel, comprising a gas burner member adapted to be placed in heating relation to said fuel supplying means, a vaporizing chamber for a volatile combustible fluid in communication with said casing, heating means for vaporizing the fluid in said chamber, the resulting vapors passing to the gas burner member for ignition, and means associated with the burner member for igniting the vapors passing thereto.

11. In an internal combustion engine, in combination, means for supplying a fuel thereto, and means for preheating the fuel comprising a gas burner member adapted to be placed in heating relation to said fuel supplying means, a vaporizing chamber for a volatile combustible fluid in communication with said casing, means for maintaining the fluid in said chamber at substantially a constant level, and heating means for vaporizing the fluid in said chamber, and resulting vapors passing to the gas burner member for ignition.

12. A device for preheating the fuel supplied to an internal combustion chamber which includes electrically heated means for vaporizing a volatile combustible fluid, and means for burning the vapors generated.

In testimony whereof I affix my signature.

THOMAS J. LITLE, Jr.